US009163674B2

(12) United States Patent
Combs et al.

(10) Patent No.: US 9,163,674 B2
(45) Date of Patent: Oct. 20, 2015

(54) FINAL DRIVE DISCONNECT MECHANISM

(71) Applicant: Allison Transmission Inc., Indianapolis, IN (US)

(72) Inventors: Robert F. Combs, Mulberry, IN (US); Charles A. Barker, Danville, IN (US); James Priest, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 289 days.

(21) Appl. No.: 13/798,407

(22) Filed: Mar. 13, 2013

(65) Prior Publication Data

US 2014/0262670 A1 Sep. 18, 2014

(51) Int. Cl.
*F16D 11/14* (2006.01)
*F16D 23/12* (2006.01)

(52) U.S. Cl.
CPC .......... *F16D 11/14* (2013.01); *F16D 2023/123* (2013.01)

(58) Field of Classification Search
CPC .............. Y10T 403/7031; F16D 11/14; F16D 2011/004; F16D 2011/002; F16D 2023/123; B62D 55/135; B62D 55/13
USPC ................. 192/69.91, 69.9, 69.43, 69.4, 54.2
See application file for complete search history.

(56) References Cited

U.S. PATENT DOCUMENTS

| 3,960,230 | A  | * | 6/1976 | Van Wuytswinkel | ........ 180/9.62 |
| 4,244,399 | A  |   | 1/1981 | Palau et al. |   |
| 2002/0169049 | A1 |   | 11/2002 | Borgan et al. |   |
| 2003/0125150 | A1 |   | 7/2003 | Tanzer |   |
| 2010/0108458 | A1 | * | 5/2010 | Harris et al. | ..................... 192/69 |
| 2012/0031212 | A1 | * | 2/2012 | Forrest | ......................... 74/412 R |
| 2012/0193185 | A1 |   | 8/2012 | Zhang |   |

FOREIGN PATENT DOCUMENTS

JP 59053233 A 3/1984

OTHER PUBLICATIONS

ISA/KR (KIPO): "Notification of Transmittal of the International Search Report and the Written Opinion of the International Searching Authority, or the Declaration"; Nov. 21, 2013; pp. 1-10.

* cited by examiner

*Primary Examiner* — Robert Hodge
*Assistant Examiner* — Ryan Dodd
(74) *Attorney, Agent, or Firm* — Taft Stettinius & Hollister LLP; Stephen F. Rost, Esq.

(57) ABSTRACT

The present disclosure provides a disconnect mechanism for removably coupling an input member and an output member to one another. The mechanism includes a drive member configured to be rotationally driven and a driven member rotationally coupled to the drive member. A collar is rotatably coupled to the driven member, where rotation of the drive member induces rotational and longitudinal movement of the collar along the shaft. The mechanism further includes a coupler member coupled to the collar such that the coupler member is adapted to be removably coupled to the input member and output member. As the collar moves along the longitudinal shaft, the coupler member moves longitudinally between a first position in which the input member and output member are coupled and a second position in which the input member and output member are decoupled from one another.

9 Claims, 7 Drawing Sheets

FINAL DRIVE DISCONNECT MECHANISM

FIELD OF THE DISCLOSURE

The present invention relates to a transmission or final drive assembly, and in particular, to a disconnect mechanism for a transmission or final drive assembly.

BACKGROUND

Tracked vehicles can have a prime mover for producing power and a transmission assembly for receiving said power and transferring it to a driveline or final drive assembly. The final drive assembly provides power to a sprocket or drive hub that drives the tracks along a surface. Instead of tracks, a vehicle may include wheels that receive the power from the final drive assembly and operably move the vehicle along the surface. In any case, the transmission output is connected to an input of the final drive assembly.

At some point during vehicle operation it may be desirable or necessary to maintain or service the transmission. To do so, it is often necessary to remove the transmission from the vehicle. Before the transmission can be removed from the vehicle, however, the transmission output must be disconnected from the final drive assembly. Alternatively, the final drive assembly can be completely removed, but this often is complex and requires labor-intensive work.

In some military vehicles, for example, an access port or opening can be provided for a technician to access the transmission output so that the transmission output can be disconnected from the final drive assembly. In these instances, however, the accessibility to this port or opening is often easy to get to and does not require any special tooling. In other instances, the design of the final drive assembly and sprocket for the track is such that there is limited or no access to the disconnect shaft. A separate port or access opening may be required on the interior of the vehicle or the final drive assembly may need to be disconnected from the vehicle before the transmission can be serviced. This again requires a substantial amount of time and effort and is less desirable in applications where a "quick disconnect" feature is necessary.

Thus, a need exists for providing a means for disconnecting a transmission output from a final drive assembly. Moreover, it is further desirable to design a disconnect mechanism for removably coupling a first component on one axis or centerline and a second component on a different axis or centerline.

SUMMARY

In an exemplary embodiment of the present disclosure, a disconnect mechanism is provided for removably coupling an input member and an output member to one another. The mechanism includes a drive member configured to be rotationally driven and a driven member rotationally coupled to the drive member. A collar is rotatably coupled to the driven member, where rotation of the drive member induces rotational and longitudinal movement of the collar along the shaft. The mechanism further includes a coupler member coupled to the collar such that the coupler member is adapted to be removably coupled to the input member and output member. As the collar moves along the longitudinal shaft, the coupler member moves longitudinally between a first position in which the input member and output member are coupled and a second position in which the input member and output member are decoupled from one another.

In one aspect of this embodiment, the driven member includes a substantially disc-shaped body having a first flange and a second flange, where the first and second flanges extending longitudinally from the disc-shaped structure. In another aspect, the collar comprises a substantially cylindrical body having a bore defined therethrough for threadedly engaging the shaft. The substantially cylindrical body has an outer thickness and a first recessed portion and a second recessed portion defined in the substantially cylindrical body, where the first recessed portion is radially offset from the second recessed portion. Moreover, the first flange engages the first recessed portion and the second flange engages the second recessed portion, whereby the driven member and collar rotate in a substantially concomitant relationship to one another.

In a different aspect, the coupler member comprises a substantially cylindrical body having a bore defined therethrough and the coupler member comprises a shoulder disposed internally within the bore, where a bearing is disposed between the shoulder and the collar. In a further aspect, the drive member is disposed along a first centerline and the driven member, collar, and coupler member are disposed along a second centerline, where the first centerline and second centerline are offset from one another.

In another embodiment, a vehicle has a drive track for moving along a surface. The vehicle includes a transmission assembly having an output drive member, a final drive assembly having an outer housing and an output shaft disposed therein, a drive member and a driven member rotationally coupled to one another, and an input member coupled to the output shaft of the final drive assembly. The vehicle also includes a disconnect mechanism operably coupled to the driven member, where the disconnect mechanism is movable between a first position and a second position such that in the first position, the disconnect mechanism is structured to couple the output drive member and input member to one another, and in the second position, the disconnect mechanism is structured to decouple the output drive member and input member from one another.

In one aspect, the disconnect mechanism and output drive member are disposed along a first centerline, the output shaft is disposed along a second centerline, and the drive member is disposed along a third centerline. Here, the first centerline, second centerline, and third centerline are offset from one another. In another aspect, a coupler member can be coupled to the input gear, where the coupler member moves between the first position and second position based on movement of the drive member. In a related aspect, the vehicle can include a longitudinal shaft affixedly coupled to the outer housing and a collar rotatably coupled to the shaft, where the collar moves between the first position and second position concomitantly with the coupler member. Here, movement of the drive member induces rotational movement of the collar about the shaft and translational movement of the coupler member relative to the shaft.

In a different aspect, the driven member comprises a substantially circular disc having a pair of flanges extending along a longitudinal axis therefrom, the pair of flanges being radially offset from one another, and the collar including a substantially cylindrical structure having a first outer portion and a second outer portion, the first outer portion being oppositely disposed from the second outer portion such that two slots are defined therebetween. Here, the collar and driven member are coupled to one another such that one of the pair of flanges is received in one of the two slots. In a further aspect, the collar and driven member rotate substantially concomitantly with one another and the collar moves along the longitudinal axis relative to the driven member. In addition, a securable access port can be defined in the outer housing of the final drive assembly such that the securable access port is axially aligned with the drive member. In yet a further aspect, the drive member can be a gear, a sprocket, a chain, or a pulley.

In a different embodiment, a disconnect mechanism includes an output member, an input member, and an intermediate member disposed therebetween. The output member is configured to rotationally drive the input member, and the intermediate member is removably coupled to the output member and rotationally coupled to the input member. The mechanism also includes a drive member configured to be rotationally driven and a driven member rotationally coupled to the drive member. The driven member has an elongated shaft. A collar is rotatably coupled to the driven member, where rotation of the drive member induces rotational and longitudinal movement of the collar along the elongated shaft. In addition, a coupler member is coupled to the collar such that the coupler member is adapted to be removably coupled to the intermediate member and output member. As the collar moves along the elongated shaft, the coupler member moves between a first position and a second position such that in the first position the intermediate member and output member are rotatably coupled to the coupler member, and in the second position the output member is decoupled from the coupler member.

In one aspect, the disconnect mechanism can be arranged such that the drive member is disposed along a first centerline, the input member is disposed along a second centerline, and the intermediate member, driven member, collar, and coupler member are disposed along a third centerline. Here, the first centerline, second centerline, and third centerline are parallel and offset from one another. In another aspect, the disconnect mechanism can include an outer housing in which at least the drive member, driven member, intermediate member, collar and coupler member are disposed. Moreover, an access port can be defined in the outer housing, where the access port is axially aligned with the drive member such that the drive member is accessible through the access port. A securable fastener can be coupled to the outer housing at the access port such that when the fastener is coupled to the access port, the fastener is adapted to limit or prevent rotational movement of the drive member.

In a further aspect, the driven member comprises a substantially disc-shaped body having a first flange and a second flange, the first and second flanges extending longitudinally from the disc-shaped structure. The collar can include a substantially cylindrical body having a bore defined therethrough for threadedly engaging the shaft, the substantially cylindrical body defining a first recessed portion and a second recessed portion, where the first recessed portion is radially offset from the second recessed portion. In this aspect, the first flange engages the first recessed portion and the second flange engages the second recessed portion, whereby the driven member and collar rotate in a substantially concomitant relationship to one another.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In a general sense, the present disclosure relates to the control of torque transfer from one member to another. In one condition, a first member and a second member can be coupled to one another such that torque can be transferred therebetween, and in a second condition the first and second members can be decoupled from one another such that torque cannot be transferred therebetween. In one aspect, a third member can be coupled between the first and second members to facilitate the transfer of torque. The third member can be controllably moved between different positions to allow or disallow torque transfer. While this disclosure provides different examples of this control in a vehicular application, the disclosure is not intended to be limited to this application. One skilled in the art will appreciate varying aspects of the present disclosure outside of the vehicular application provided herein.

Figure 1:
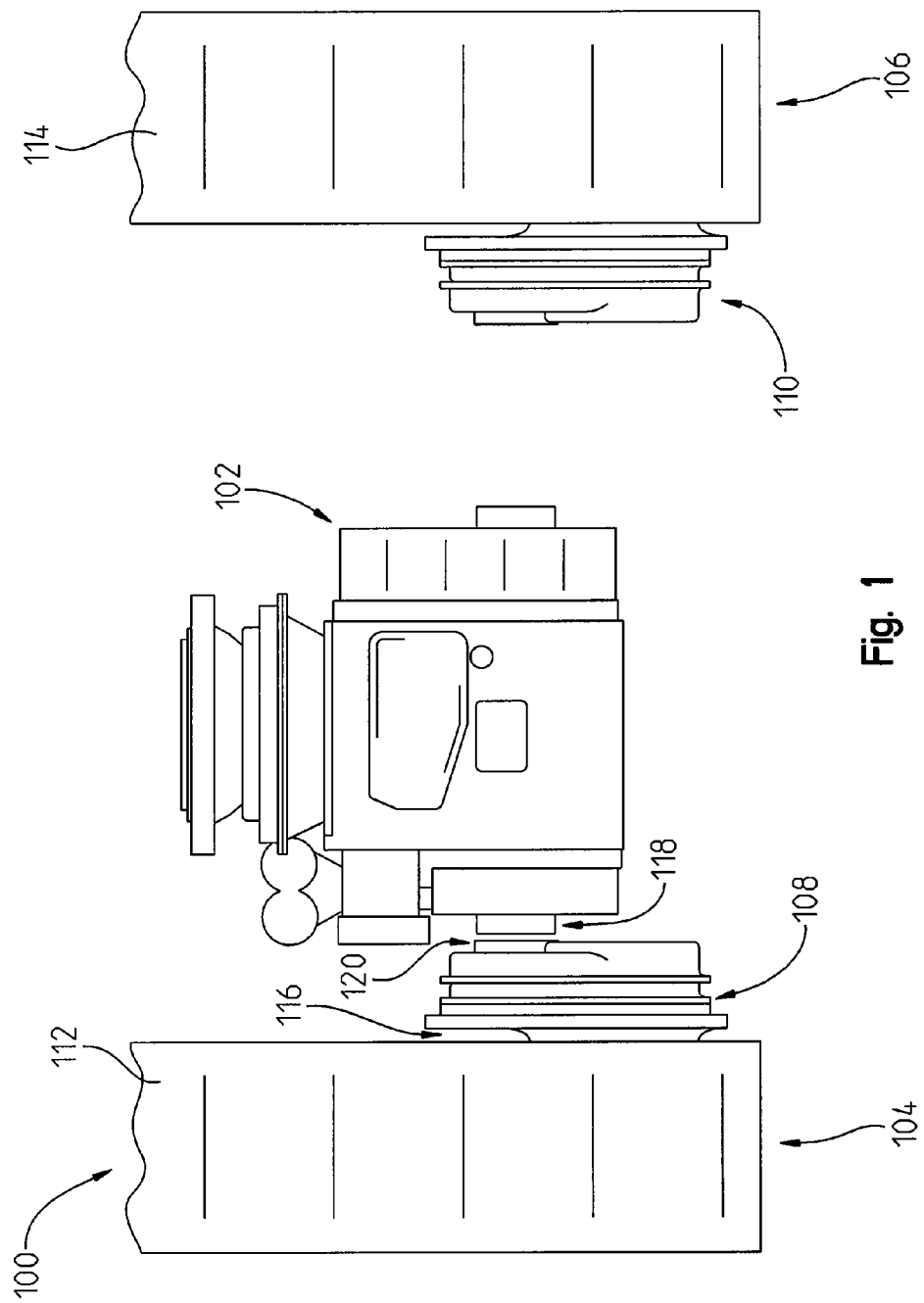
FIG. 1 is a partial perspective view from above of a tracked vehicle having a transmission assembly and final drive assembly.

With reference to FIG. 1, a first illustrated embodiment includes a portion of a vehicle or machine 100. The vehicle or machine 100 can be any on-highway or off-highway vehicle or machine. The vehicle or machine 100 can be used as an agricultural, construction, forestry, military or other type of vehicle or machine. In FIG. 1, the vehicle or machine 100 can include a transmission assembly 102 that can receive power from a power-generating mechanism such as a prime mover, engine, motor, etc. The transmission assembly 102 can transfer power or torque to a ground-engaging mechanism via a driveline, final drive assembly, or other means. The ground-engaging mechanism can include a wheel or track.

In FIG. 1, for example, the transmission assembly 102 includes an output portion 118 that can be coupled to an input portion 120 of a final drive assembly 108. The output portion 118 can be mechanically coupled to the input portion 120 via a gearing and shaft arrangement. For instance, the transmission assembly 102 can include a first shaft (not shown) disposed in the output portion 118. The first shaft can include a gear or sprocket (not shown) that can transfer torque to a second shaft (not shown) disposed in the input portion 120 of the final drive assembly 108.

The final drive assembly 108 can also include an output (not shown) that drives a first drive track 112 on a first side 104 of the vehicle or machine 100. The output can be rotatably coupled to a track sprocket (not shown) that drives the first drive track 112. Similarly, the vehicle or machine 100 can include a second drive track 114 disposed on a second side 106 thereof for moving the vehicle or machine 100 along a ground surface. In FIG. 1, the first drive track 112 can be powered by the first final drive assembly 108 and the second drive track can be powered by a second final drive assembly 110. In this manner, the first drive track 112 and second drive track 114 form the ground-engaging mechanism of the vehicle or machine 100. As previously described, however, other vehicles or machines may include one or more wheels as the ground-engaging mechanism. Moreover, a different vehicle or machine may include additional drive tracks or a combination of wheels and drive tracks as ground-engaging mechanisms.

As described above, many conventional vehicles or machines require the transmission assembly to be disassembled or disconnected from the final drive assembly before the transmission assembly can be serviced. In some instances, the entire transmission assembly needs to be removed from the vehicle or machine. To do so, the output of the transmission is disconnected from the input of the final drive assembly. In most conventional arrangements, there is sufficient room to access the connection between the transmission assembly and final drive assembly to mechanically disconnect the two assemblies from one another. For example, a shaft that connects the output of the transmission assembly to the input of the final drive assembly can be removed quickly and without much effort. However, in other instances including that of FIG. 1, there is little to no room to access the connection between the output of the transmission assembly and the input of the final drive assembly.

In FIG. 1, for example, the first drive track 112 is driven by a track sprocket (not shown). The track sprocket is driven by an output (not shown) of the final drive assembly 108. An area or region 116 between the first drive track 112, and most notably its track sprocket, and the final drive assembly 108 can be extremely tight, thereby making it difficult, if not nearly impossible, to access the connection between the final drive assembly 108 and the transmission assembly 102. Due to the location and positioning of the track sprocket relative to the final drive assembly 108, an alternative or new mechanism is necessary for decoupling the output of the transmission assembly 102 from the input of the final drive assembly 108.

Figure 2:
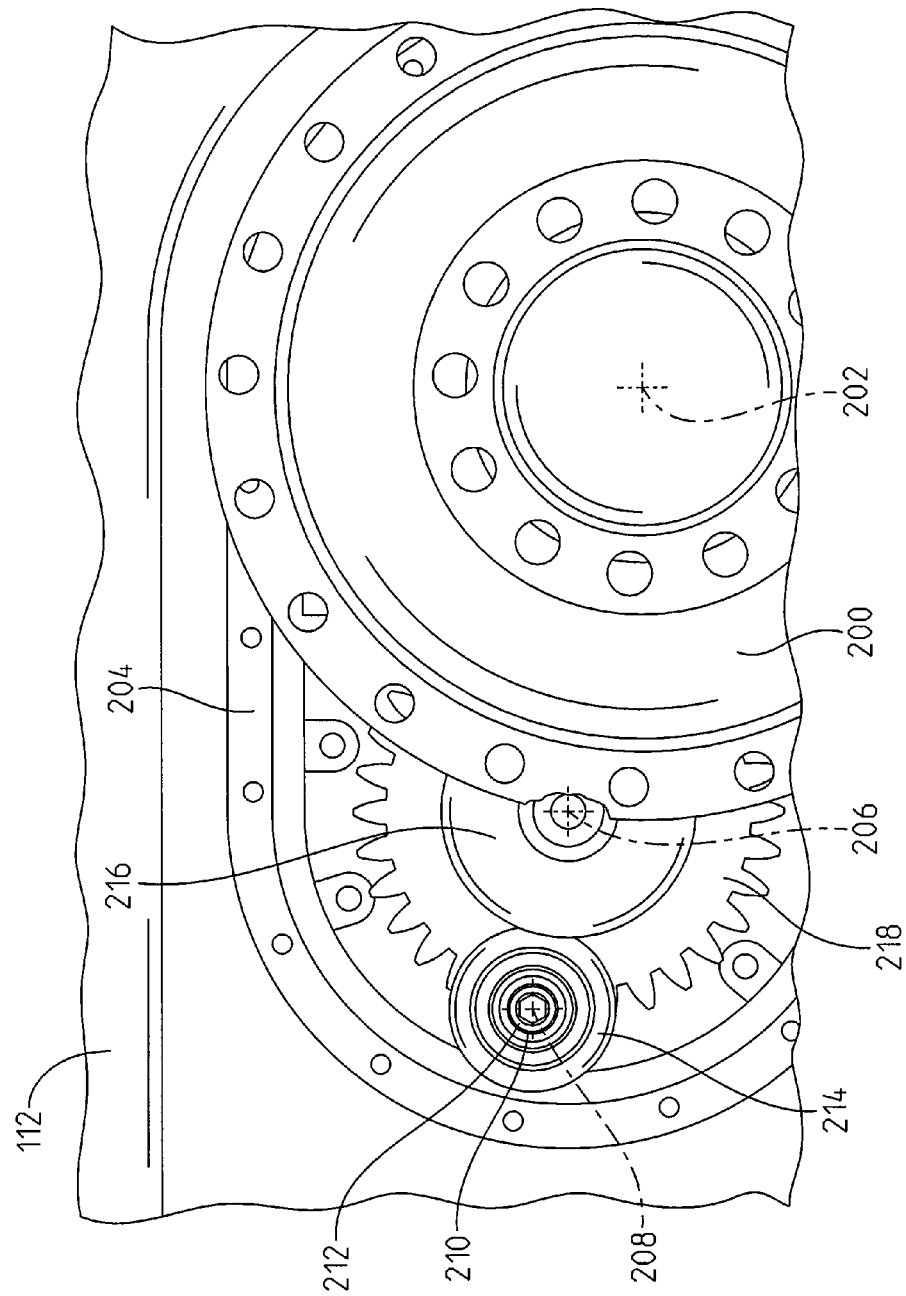
FIG. 2 is a partial cross-sectional view of the final drive assembly of FIG. 1.

Referring to FIG. 2, a vehicle drive hub or housing 200 is shown. The track sprocket (not shown) that drives the first drive track 112 can be mounted or coupled to the drive hub 200. Although not shown, the input member of the final drive assembly 108 can be disposed along a first centerline or axis 202. The output (not shown) of the final drive assembly 108 can also be disposed along this first centerline or axis 202. Thus, the track sprocket may also be rotatably disposed about this first centerline or axis 202.

The input (not shown) of the final drive assembly 108 can be a gear, sprocket, shaft or other mechanism that receives torque from the transmission assembly 102. In this disclosure, the input of the final drive assembly will be referred to as an input member or an input of the final drive assembly.

In FIG. 2, the transmission assembly 102 can have an output disposed about a second centerline or axis 206. The output member of the transmission assembly 102 may include a shaft, gear, sprocket, or other known mechanism. In this disclosure, the output of the transmission assembly 102 will be referred to as an output member or an output of the transmission assembly. As shown, the first centerline or axis 202 and the second centerline or axis 206 are disposed within an outer housing 204. One of the issues addressed by the present disclosure is the difficulty or inability to access the second centerline or axis 206 due to the positioning or location of the first drive track 112, the track sprocket of the first drive track 112, the outer housing 204 and the location of the second centerline or axis 206 relative thereto.

In FIG. 2, a third centerline or axis 208 is defined within the outer housing 204. The third centerline or axis 208 can be parallel to the first and second centerlines. Moreover, the third centerline or axis 208 can be disposed offset from the first centerline or axis 202 and the second centerline or axis 206. In the embodiment of FIG. 2, the second centerline or axis 206 is disposed between the first centerline or axis 202 and the third centerline or axis 208. As also shown, the third centerline or axis 208 is disposed closest to an edge of the housing 204. In effect, an access opening 210 is defined in the housing 204 to allow for access to this centerline or axis 208. In conventional vehicles or machines, this third centerline or axis is unnecessary and not provided for, as a service technician, for example, can remove a shaft or other mechanism at the transmission output centerline (i.e., the second centerline or axis 206 of FIG. 2) to effectively remove the torque connection between the transmission output and the final drive input.

The access opening 210 can be covered by a fitting 212 such as a fastener, cap, plug, plate, or other covering mechanism. When the vehicle or machine 100 is in operation, the fitting 212 can be securably coupled to the housing 204 to prevent the output of the transmission assembly 102 from being disconnected from the input of the final drive assembly 108. The fitting 212 can be an anti-theft type fitting, an anti-rotation fitting, or include some other means for providing security to the access opening 210.

As shown in FIG. 2, the access opening 210 provides access to the third centerline or axis 208. A drive member 214 can be rotatably disposed about the third centerline or axis 208. The drive member 214 can include a gear, a sprocket, a wheel, a chain, a pulley or any other mechanism. For instance, the drive member 214 can be a worm gear that can be rotated by a tool or other means via the access opening 210. Alternatively, the drive member 214 can be a sprocket that rotatably drives a chain or belt. The drive member 214 can take the form of any shape or material. In this disclosure, the drive member 214 is illustrated as being disc-shaped like a gear, sprocket or wheel. In other embodiments, the drive member 214 can be similar to a clutch used to controllably connect or disconnect the output member and input member to one another. In any case, the drive member 214 is disposed along the third centerline or axis 208 and is accessible via the access opening 210 defined in the outer housing 204.

The drive member 214 can be coupled to a driven member 216. The driven member 216 can be disposed along the second centerline or axis 206, which is the same centerline or axis as the output member or output of the transmission assembly 102. The drive member 214 and driven member 216 may be in contact with another similar to meshing gears. In another aspect, the drive member 214 and driven member 216 may be offset and not in contact with one another, such that a chain or belt transfers rotational energy from the drive member 214 to the driven member 216. In any case, the drive member 214 rotatably drives the driven member 216 as part of a disconnect mechanism.

In FIG. 2, another member 218 is shown disposed along the second centerline or axis 206. This is perhaps better shown in FIG. 3. The member 218, referred to herein as an intermediate member 218, can take the form of a gear having a plurality of gear teeth disposed about an outer radial surface. The intermediate member 218 can be rotatably coupled to the input member or input of the final drive assembly 108. In this manner, the intermediate member 218 can receive torque from an output member 302 of the transmission assembly 102 and transfer said torque to the input member (not shown).

Figure 3:
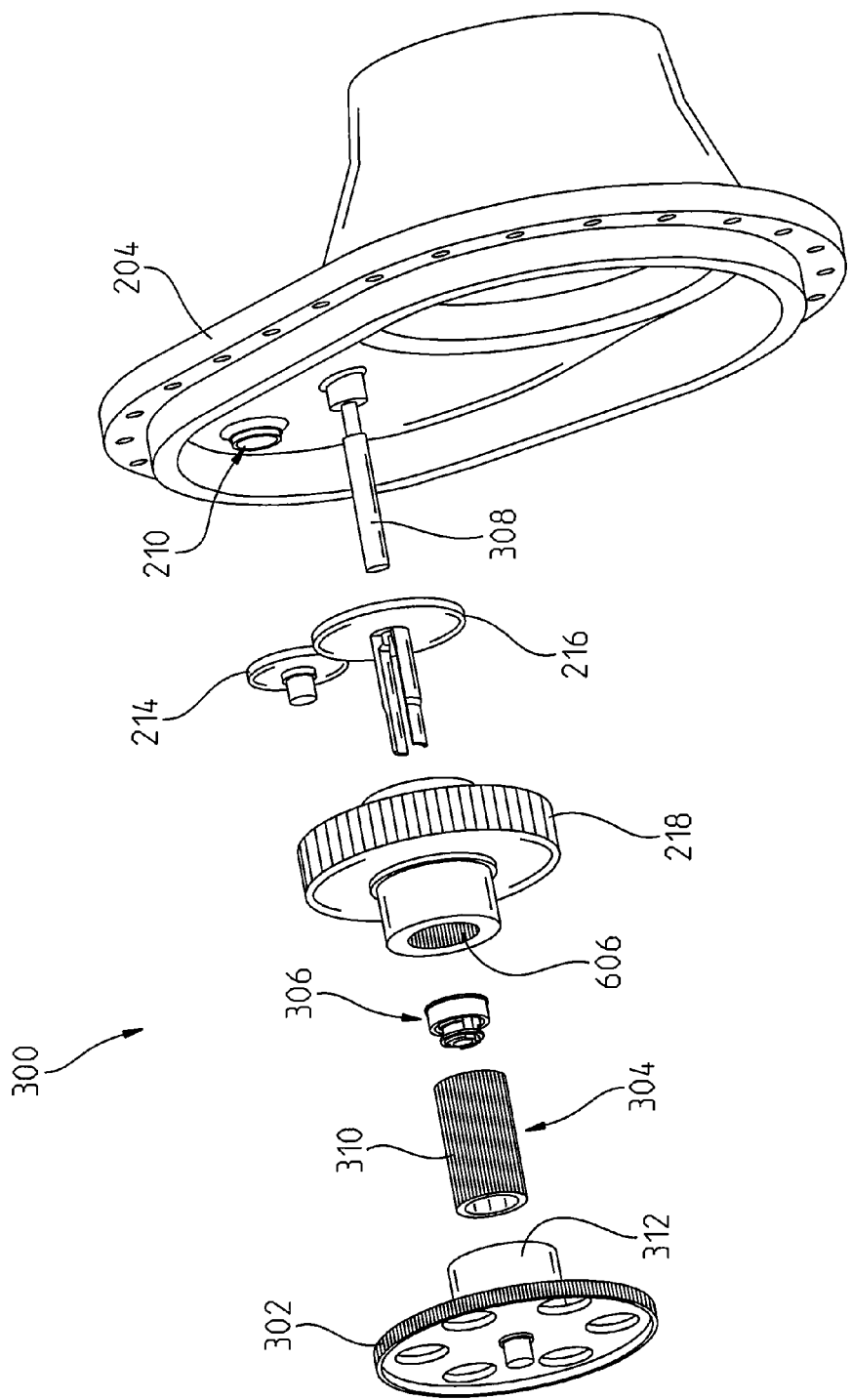
FIG. 3 is an exploded view of a disconnect mechanism for a transmission and final drive assembly.

With reference to FIG. 3, a disconnect assembly or mechanism 300 is shown. The disconnect mechanism 300 can provide a means for coupling and decoupling the output member 302 to the input member (not shown). When the input member and output member 302 are coupled to one another, the output member 302 can transfer torque to the intermediate member 218 which thereby transfers torque to the input member. When the input member and output member 302 are decoupled from one another, however, the output member 302 can be decoupled from the intermediate member 218 such that the torque path from the transmission assembly 102 to the final drive assembly 108 is disconnected. In this instance, the transmission assembly 102 is disconnected from the final drive assembly 108 and it can be removed from the vehicle or machine 100 for service or maintenance.

The disconnect mechanism 300 includes the drive member 214 and driven member 216 as shown in FIG. 3. The disconnect mechanism 300 can also include a coupler member 304 and a collar assembly 306. The coupler member 304 can be a substantially cylindrical body having a plurality of threads or splines 310 configured on the outer radial surface thereof. The coupler member 304 is configured to engage the output member 302 and the intermediate member 218 when the output member 302 and input member (not shown) are coupled to one another. In particular, the outer splines 310 of the coupler member 304 can mate with and engage corresponding splines (not shown) defined on an interior surface of a pilot hub 312 of the output member 302. Similarly, the outer splines 310 can engage internal threads or splines 606 of the intermediate member 218. In this instance, when the output member 302 and input member are coupled to one another, one end of the coupler member 304 is engaged to the output member 302 and an opposite end is engaged to the intermediate member 218. Thus, as the output member 302 rotates and drives the input member, it in turn rotatably drives the coupler member 304 and intermediate member 218 in a substantially concomitant relationship.

The collar assembly 306 can be disposed within an internal bore defined by the coupler member 304 in a manner such that the collar assembly 306 and coupler member 304 move longitudinally (i.e., translationally or laterally) together in a substantially concomitant relationship. The coupler member 304, however, does not rotate unless it is rotatably coupled to the output member 302. On the other hand, the collar assembly 306, and in particular a collar member 500 (FIG. 5), can rotate in a substantially concomitant relationship with the driven member 216. Thus, as the driven member 216 rotates, it in turn rotatably drives the collar member 500. In effect, the collar member 500 is rotatably coupled to the driven member 216.

As the collar member 500 is rotated by the driven member 216, the collar member 500 rotates about an elongated shaft 308 integrally coupled to the housing 204. The elongated shaft 308 extends from the housing 204 in a longitudinal direction. The elongated shaft 308 can include a plurality of threads to which the collar member 500 is threadedly coupled. The collar member 500 therefore can travel in the longitudinal direction along the elongated shaft 308 as the drive member 214 rotatably drives the driven member 216.

Figure 4:
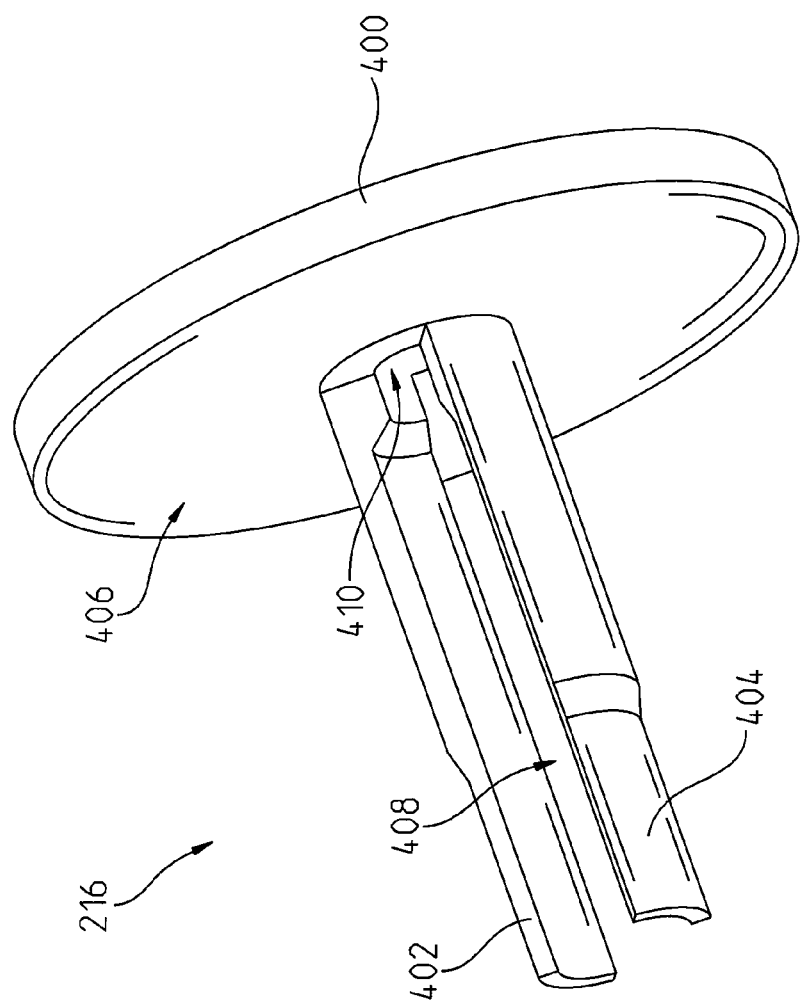
FIG. 4 is one embodiment of a driven member of the disconnect mechanism of FIG. 3.
Figure 5:
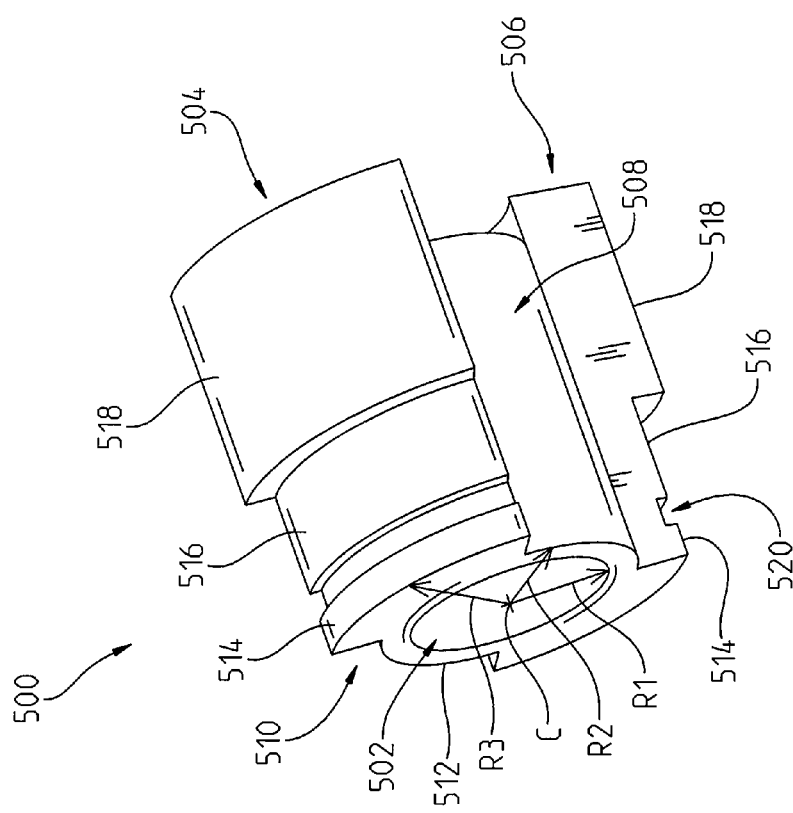
FIG. 5 is one embodiment of a collar of the disconnect mechanism of FIG. 3.

To further understand the coupling relationship between the driven member 216 and collar member 500, reference is made to FIGS. 4 and 5. As shown in FIG. 4, the driven member 216 can include a substantially disc-shaped body 400. The substantially disc-shaped body 400 can include threads, splines, teeth, channels, spokes, etc. for coupling to the drive member 214. A first flange 402 and a second flange 404 can be integrally coupled to and extend in the longitudinal direction from one side 406 of the disc-shaped body 400. In this arrangement, the first flange 402 can be radially spaced from the second flange 404. In another aspect, the first flange 402 can be transversely offset from the second flange 404. In any case, a longitudinal opening 408 is defined between the first flange 402 and second flange 404 to accommodate the collar member 500.

Moreover, this longitudinal opening 408 is integrally coupled with an internal bore 410 defined in the substantially disc-shaped body 400. The defined radius of the internal bore 410 and longitudinal opening 408 can be different, but in any case, the radius is large enough to accommodate the outer radius of the elongated shaft 308. In other words, the elongated shaft 308 can pass at least partially through the internal bore 410 and longitudinal opening 408 of the driven member 216.

In FIG. 5, the collar member 500 can be a substantially cylindrical body 512 that defines an internal bore 502 therethrough. Although not shown in FIG. 5, the internal bore 502 can define a plurality of threads for engaging the elongated shaft 308 of the housing 204. Thus, the collar member 500 can be rotatably driven about the elongated shaft 308 by the driven member 216.

As shown in FIG. 5, the size of the internal bore 502 can be defined by a first radius of R1 from a center point C of the internal bore 502. The substantially cylindrical body 512 can have an outer radial thickness defined by second radius R2. The radial thickness of the substantially cylindrical body 512 therefore is defined by the difference in the first radius R1 and second radius R2. In addition, the collar member 500 can also include a first portion 504 and a second portion 506. Each of the first portion 504 and second portion 506 include a first outer portion 514. The first outer portion 514 can have an outer radius defined by a third radius R3, whereby the radial thickness of the first outer portion 514 is defined by the difference between the third radius R3 and the first radius R1. Here, the third radius R3 is greater than the first radius R1 and second radius R2. As such, the first portion 504 and second portion 506 extend outwardly from the substantially cylindrical body 512.

Moreover, the first portion 504 and second portion 506 can also include a second outer portion 516 and a third outer portion 518. The second outer portion 518 has a defined radial thickness that can be greater than the radial thickness of the first outer portion 514. The third outer portion 518 can have a defined radial thickness that is greater than the radial thickness of the first outer portion 514 and the second outer portion 516.

The first portion 504 and second portion 506 can be radially offset from one another as well. As such, a first recessed portion 508 and a second recessed portion 510 can be defined between the first portion 504 and second portion 506. In effect, the first recessed portion 508 and second recessed portion 510 can define radial channels slots as shown in FIG. 5. Each of the first recess portion 508 and second recessed portion 510 are configured to receive one of the first flange 402 and second flange 404 of the driven member 216. Thus, the collar member 500 can be rotatably coupled to the driven member 216 when the first flange 402 and second flange 404 of the driven member 216 are received by the first recessed portion 508 and second recessed portion 510 of the collar member 500.

Figure 6:
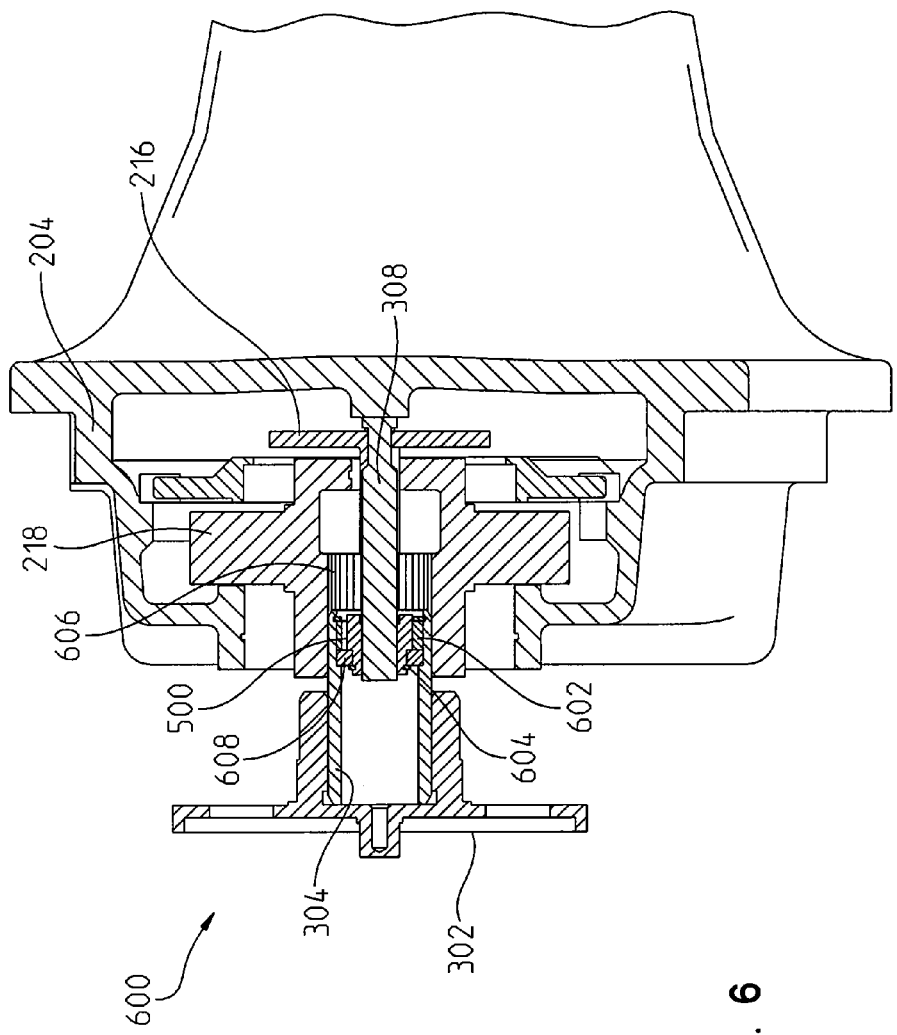
FIG. 6 is a cross-sectional view of the disconnect mechanism in a first position.
Figure 7:
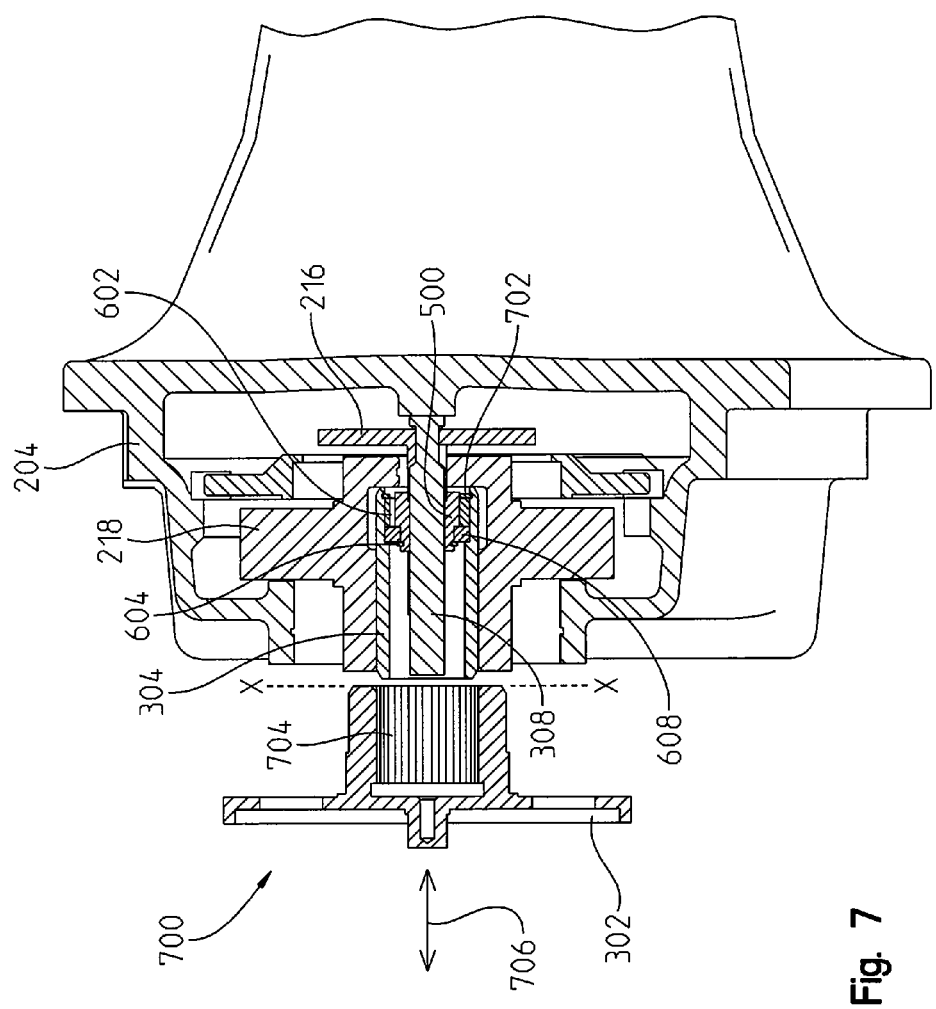
FIG. 7 is a cross-sectional view of the disconnect mechanism in a second position.

With reference to FIGS. 6 and 7, the disconnect mechanism 300 is shown in a first position 600 and a second position 700. In FIG. 6, the coupler member 304 is coupled to the intermediate member 218 so that torque can be transferred from the output member 302 to the input member (not shown) via the coupler member 304 and intermediate member 218. In FIG. 7, the coupler member 304 is decoupled from the output member 302, thereby limiting or preventing torque from being transferred to the input member (not shown). In the decoupled position of FIG. 7, the transmission assembly 102 can be removed from the vehicle or machine 100 for maintenance or service.

Referring to FIGS. 3, 5 and 6, the collar assembly 306 includes the collar member 500 disposed within an internal bore of the coupler member 304. The collar assembly 306 can further include a first bearing 602 and a second bearing 608, where each may be a ball bearing, roller bearing, needle bearing, etc., that is disposed between an inner radial surface of the coupler member 304 and the third outer portion 518 of the collar member 500. The second bearing 608 can be disposed adjacent to a first retaining ring 604 and the first bearing 602 can be disposed adjacent to a second retaining ring 702 (FIG. 7). As such, the first bearing 602 and second bearing 608 have only limited, if any, longitudinal movement along the surface of the second outer portion 516 and third outer portion 518 of the collar member 500. The first retaining ring 604 can be disposed in an opening 520 defined between the first outer portion 514 and second outer portion 516 of the collar member 500. The second retaining ring 702 can be disposed in an opening defined in the coupler member 304.

In the coupled position 600 of FIG. 6, the coupler member 304 is positioned towards the output member 302 in the longitudinal direction 706. In the decoupled position 700 of FIG. 7, the coupler member 304 is positioned away from the output member 302 in the longitudinal direction 706. Due to the coupling or engagement of the collar assembly 306 to the coupler member 304, the coupler member 304 can be moved in a concomitant relationship with the collar assembly 306 in either direction (i.e., to the left or right in FIGS. 6 and 7) along the longitudinal direction 706. In doing so, the outer splines 310 of the coupler member 310 can be in a sliding engagement with corresponding internal splines 606 of the intermediate member 218 and internal splines 704 of the output member 302. Therefore, while the collar member 500 is rotatably coupled to the driven member 216 and is threadedly coupled to the elongated shaft 308, the coupler member 304 can move either to the left or right along the longitudinal direction 706.

As the coupler member 304 moves about in the longitudinal direction, it can become coupled or decoupled from the output member 302. Referring to FIG. 7, once the coupler member 304 crosses axis X-X, it can either be partially coupled or decoupled. For instance, if the coupler member 304 moves to the left in FIG. 7 beyond axis X-X, the coupler member 304 and output member 302 are coupled to one another. However, if the coupler member 304 moves to the right in FIG. 7 beyond axis X-X, the coupler member 304 is decoupled from the output member 302.

The elongated shaft 308 can be grounded or fixedly coupled to the outer housing 204. In this aspect, the elongated shaft 308 does not rotate. Instead, the collar member 500 rotates relative to the elongated shaft 308 as the driven member 216 is rotatably driven by the drive member 214. Thus, as the driven member 216 rotates about the elongated shaft 308, the engagement of the first flange 402 and second flange 404 with the collar member 500 induces rotational movement of the collar assembly 306 relative to the elongated shaft 308. With the collar member 500 being threadedly coupled to the elongated shaft 308, the collar assembly 306 moves along the longitudinal direction 706 based on the direction by which the drive member 214 is rotated.

In the above-described aspects, the rotation of the drive member 214 does not induce any rotational movement of the intermediate member 218, and therefore the input member or input to the final drive assembly 108 does not receive torque when the drive member 214 is rotationally driven. In another aspect, the drive member 214 cannot be rotationally driven when the output member 302 is rotationally driven. In an alternative aspect, it may be possible to drive the drive member 214 even if the output member 302 is moving.

The drive member 214 can be controlled by a motor, for example, the motor can be an electric motor, a hydraulic motor, or any type of motor. Alternatively, a tool or mechanism such as a socket wrench or the like may be able to couple to the fitting 212 and rotatably drive the drive member 214. There may be other automatic, semi-automatic, or non-automatic mechanisms for driving the drive member 214. Some of these mechanisms can be electrically-powered, mechanically-powered, hydraulically-powered, pneumatically-powered, or a combination thereof.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle having a drive track for moving along a surface, comprising:
    a transmission assembly having an output drive member;
    a final drive assembly having an outer housing;
    a drive member and a driven member continuously rotationally coupled to one another within the outer housing;
    an input member coupled to the final drive assembly;
    a disconnect mechanism operably coupled to the driven member, where the disconnect mechanism is movable between a first position and a second position; and
    wherein:
        in the first position, the disconnect mechanism is structured to couple the output drive member and input member to one another, and
        in the second position, the disconnect mechanism is structured to decouple the output drive member and input member from one another.

2. The vehicle of claim 1, wherein:
    the disconnect mechanism and output drive member are disposed along a first centerline;
    the drive member is disposed along a second centerline;
    where, the first centerline and second centerline are offset from one another.

3. The vehicle of claim 1, wherein the disconnect mechanism comprises:
    a longitudinal shaft affixedly coupled to the outer housing; and
    a collar rotationally coupled to the shaft, where the collar moves between the first position and second position concomitantly with the coupler member.

4. The vehicle of claim 3, wherein movement of the drive member induces rotational movement of the collar about the shaft and translational movement of the coupler member relative to the shaft.

5. The vehicle of claim 3, wherein:
the driven member comprises a substantially circular disc having a pair of flanges extending along a longitudinal axis therefrom, the pair of lugs being radially offset from one another; and
the collar comprising a substantially cylindrical structure having a first outer portion and a second outer portion, the first outer portion being oppositely disposed from the second outer portion such that two slots are defined therebetween;
further wherein, the collar and driven member are coupled to one another such that one of the pair of flanges is received in one of the two slots.

6. The vehicle of claim 5, wherein the collar and driven member rotate substantially concomitantly with one another and the collar moves along the longitudinal axis relative to the driven member.

7. The vehicle of claim 1, further comprising a securable access port defined in the outer housing of the final drive assembly, the securable access port being axially aligned with the drive member.

8. The vehicle of claim 1, wherein the drive member comprises a gear, a sprocket, a chain, or a pulley.

9. The vehicle of claim 1, wherein the disconnect mechanism comprises:
a coupler member coupled to an input gear, where the coupler member moves between a first position and a second position based on movement of the drive member.

\* \* \* \* \*